United States Patent
Wiputra

(10) Patent No.: US 9,953,671 B1
(45) Date of Patent: Apr. 24, 2018

(54) SATURATION-BASED VERIFICATION OF MAGNETIC TAPE STORAGE

(71) Applicant: Oracle International Corporation, Redwood Shores, CA (US)

(72) Inventor: Eduardo Raymaska Wiputra, Westminster, CO (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/665,340

(22) Filed: Jul. 31, 2017

(51) Int. Cl.
*G11B 5/09* (2006.01)
*G11B 5/584* (2006.01)
*G11B 5/008* (2006.01)
*G11B 20/18* (2006.01)

(52) U.S. Cl.
CPC .......... *G11B 5/584* (2013.01); *G11B 5/00813* (2013.01); *G11B 20/1879* (2013.01)

(58) Field of Classification Search
None
See application file for complete search history.

(56) References Cited

U.S. PATENT DOCUMENTS

| 4,975,895 | A | * | 12/1990 | Yanagi | G11B 7/085 369/44.29 |
| 5,793,558 | A | * | 8/1998 | Codilian | G11B 21/083 360/78.06 |
| 6,490,119 | B1 | * | 12/2002 | Mittal | G11B 5/5552 360/78.05 |
| 6,674,605 | B1 | * | 1/2004 | Eli | G11B 5/5552 360/78.05 |
| 7,072,133 | B1 | * | 7/2006 | Yip | G11B 5/2657 360/121 |
| 2004/0212916 | A1 | * | 10/2004 | Nakao | G11B 5/584 360/77.12 |
| 2007/0206318 | A1 | * | 9/2007 | DeRosa | G11B 5/5547 360/78.06 |
| 2009/0002866 | A1 | * | 1/2009 | Shaver | G11B 5/012 360/51 |

* cited by examiner

*Primary Examiner* — Peter Vincent Agustin
(74) *Attorney, Agent, or Firm* — Invoke

(57) ABSTRACT

Techniques for verifying a magnetic tape are disclosed. The techniques include obtaining a position signal generated by reading a magnetic tape using a stationary tape head. Next, a simulated current for adjusting a position of the tape head to follow a track on the magnetic tape is updated using the position signal. The simulated current is then compared to one or more saturation limits to generate a verification result for a servo pattern on the magnetic tape, wherein the verification result classifies the magnetic tape as usable or unusable. Finally, the verification result is outputted for use in managing subsequent use of the magnetic tape.

20 Claims, 9 Drawing Sheets

US 9,953,671 B1

SATURATION-BASED VERIFICATION OF MAGNETIC TAPE STORAGE

TECHNICAL FIELD

The present disclosure relates to magnetic tape storage. In particular, the present disclosure relates to saturation-based verification of magnetic tape storage.

BACKGROUND

In magnetic tape storage technology, precise tracking performance is typically required to position a tape head in a tape drive relative to a magnetic tape so that the head can read data from or write data to a proper track position on the tape. To assist in positioning of the tape head, a servo pattern that encodes position information may be written onto the magnetic tape during manufacturing of the magnetic tape. The tape head may read the servo pattern, and a controller for the tape head may use a position error signal (PES) generated from the read servo pattern to adjust the position of the tape head to move between tracks and/or follow a given track.

On the other hand, a magnetic tape may experience lateral tape motion (LTM) during writing of the servo pattern, resulting in lateral pattern motion (LPM) in the written servo pattern. Sufficient LPM in the servo pattern may degrade the tracking performance of the tape head and interfere with the reliability and usability of the magnetic tape.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. SATURATION-BASED VERIFICATION OF MAGNETIC TAPE STORAGE
4. EXAMPLE EMBODIMENT
5. VERIFYING A SERVO PATTERN ON A MAGNETIC TAPE
6. GENERATING A VERIFICATION RESULT FOR A SERVO PATTERN ON A MAGNETIC TAPE
7. COMPUTER NETWORKS AND CLOUD NETWORKS
8. MISCELLANEOUS; EXTENSIONS
9. HARDWARE OVERVIEW

1. General Overview

Techniques for verifying a magnetic tape are disclosed. The techniques include obtaining a position signal generated by reading a magnetic tape using a stationary tape head. Next, a simulated current for adjusting a position of the tape head to follow a track on the magnetic tape is calculated from the position signal. The simulated current is then compared to one or more saturation limits to generate a verification result for a servo pattern on the magnetic tape, wherein the verification result classifies the magnetic tape as usable or unusable. Finally, the verification result is outputted for use in managing subsequent use of the magnetic tape.

One or more embodiments described in this Specification and/or recited in the claims may not be included in this General Overview section.

2. Architectural Overview

Figure 1:
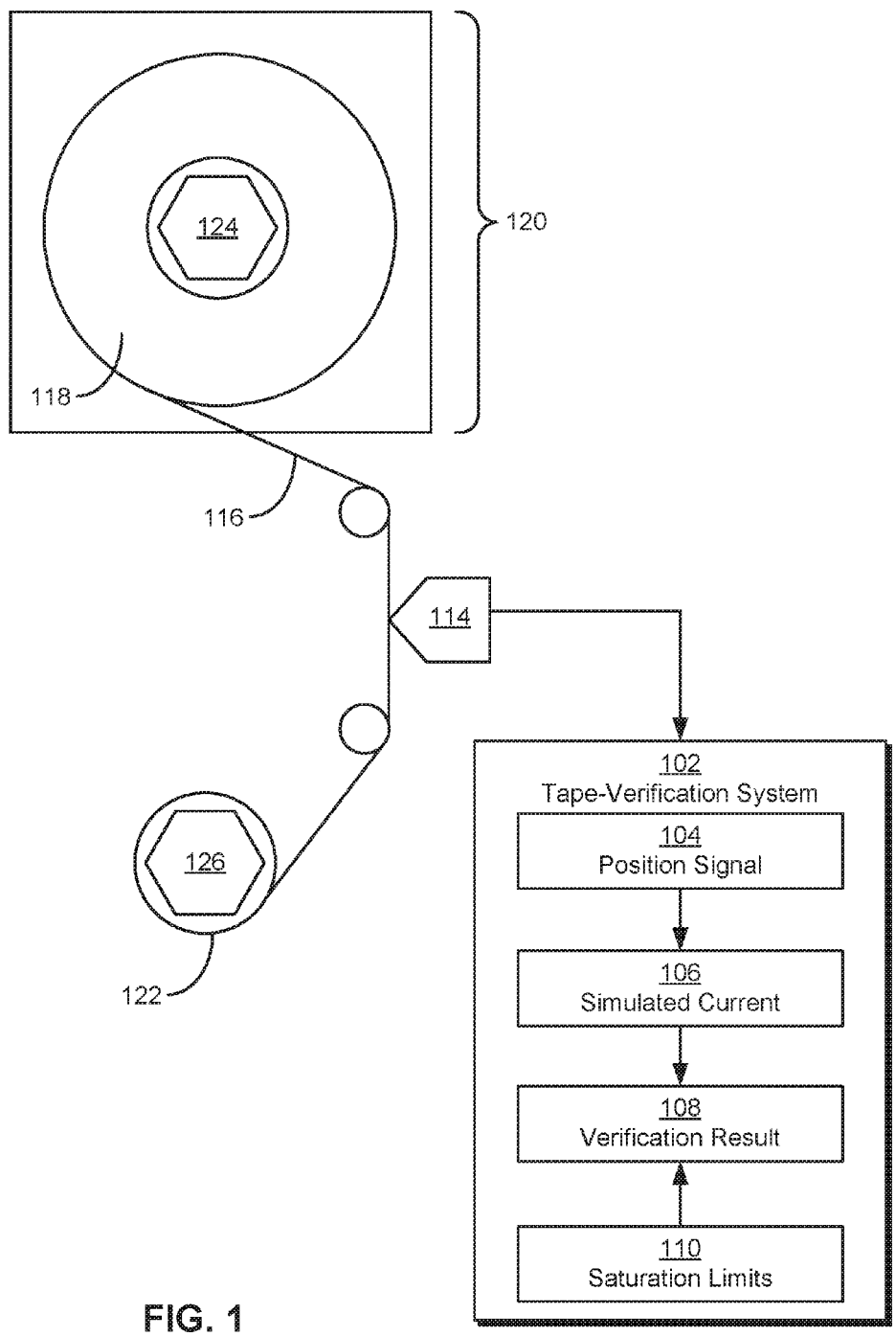
FIG. 1 illustrates a system in accordance with one or more embodiments.

FIG. 1 illustrates a system in accordance with one or more embodiments. As illustrated in FIG. 1, the system may include a tape-verification system 102 that verifies the usability of a magnetic tape 116. Magnetic tape 116 may be used to store digital data on a series of parallel tracks that span the length of magnetic tape. For example, magnetic tape 116 may be used to archive and/or retain data in a data center and/or for an organization.

To verify the usability of magnetic tape 116, magnetic tape 116 may be unwound from one reel 118 in a cartridge 120 onto another reel 122 by a number of reel drive motors 124-126. During unwinding of magnetic tape 116, a stationary tape head 114 may generate a position signal 104 from a servo pattern written onto magnetic tape 116. For example, tape head 114 may generate position signal 104 as an open-loop measurement of a position error signal (PES) from magnetic tape 116 by reading the servo pattern from magnetic tape 116 as magnetic tape 116 is moved longitudinally between reels 118 and 122. The PES may represent position data for tape head 114 that would, in normal reading and/or writing of magnetic tape 116, be used by a controller and/or actuator in a closed loop to decode the servo pattern and laterally reposition tape head 114 relative to magnetic tape 116.

During normal reading and/or writing of magnetic tape 116, a deviation in the servo pattern may require the position of a movable tape head in a tape drive to be adjusted to follow one or more tracks encoded by the servo pattern. Moreover, the position of the tape head may be changed by applying a current to a head position actuator through a current amplifier in the tape drive. When the maximum "saturation" current generated by the amplifier is not sufficient to correct for LPM in the servo pattern, the tape drive may experience an "off-track" event, in which the tape head fails to follow a track on magnetic tape 116.

Figure 2:
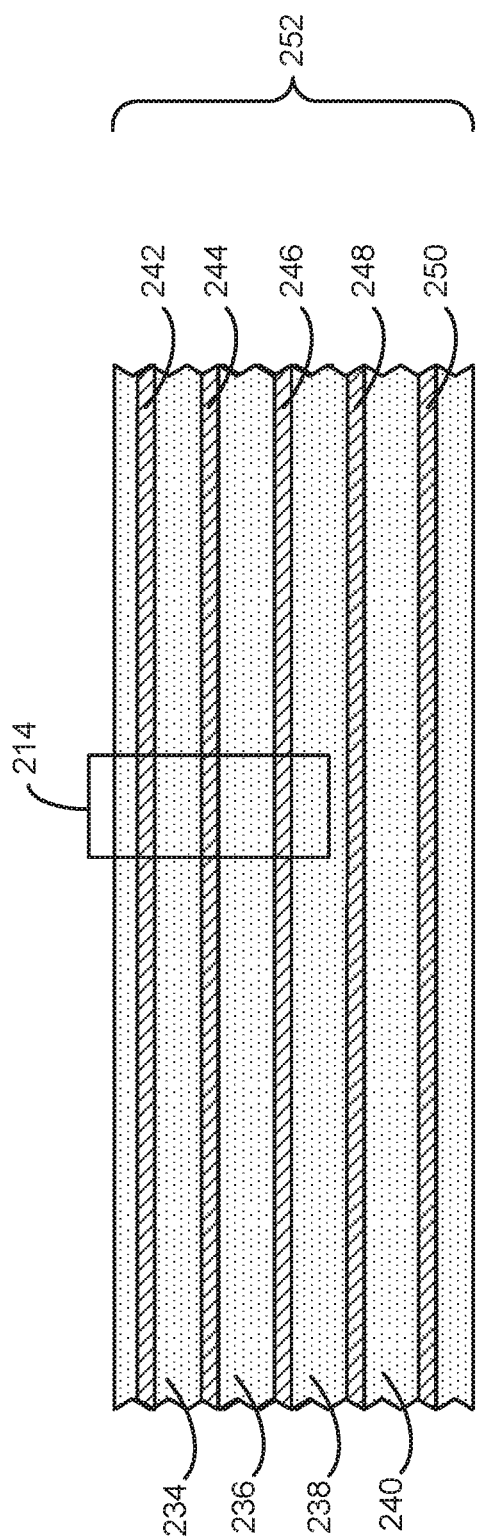
FIG. 2 shows an exemplary servo pattern on a magnetic tape in accordance with one or more embodiments.

Reading and/or writing of magnetic tape 116 may be illustrated using the exemplary servo pattern of FIG. 2. As shown in FIG. 2, a magnetic tape (e.g., magnetic tape 116 of FIG. 1) includes a series of parallel data stripes 234-240 and a series of parallel servo stripes 242-250. Data stripes 234-240 and servo stripes 242-250 may span the length of the magnetic tape and alternate with one another across a width 252 of the tape. Each data stripe 234-240 includes one or more data tracks from which data may be read and/or to which data may be written by a tape head 214. Each servo stripe 242-250 may include one or more servo tracks that specify servo control information for aligning tape head 214 with one or more data stripes 234-240. For example, servo stripes 242-250 may encode position information that can be used to align one or more read and/or write elements in tape head 214 with data stripes 234-240. As a result, a lateral deviation in one or more servo stripes 242-250 may require repositioning of tape head 214 over the appropriate data stripes 234-240. If the lateral deviation is large enough, tape head 214 may fail to be repositioned in time to follow the same track, and the tape drive may experience a read and/or write error.

On the other hand, tape-verification system 102 of FIG. 1 may use position signal 104 from the stationary tape head 114 to verify the usability of the servo pattern written onto magnetic tape 116 instead of performing standard read and/or write operations using magnetic tape 116. Such verification may be performed, for example, shortly after the servo pattern is written onto magnetic tape 116, before magnetic tape 116 is packaged and/or shipped for use, and/or before data is written to magnetic tape 116.

More specifically, tape head 114 may demodulate the servo pattern into position signal 104. Because tape head 114 is stationary, position signal 104 may fluctuate in response to LPM in a substantially straight servo pattern on tape 116, with a larger fluctuation indicating greater LPM in the servo pattern. In turn, tape-verification system 102 may analyze position signal 104 to ensure that lateral tape motion (LTM) during writing of the servo pattern does not produce lateral pattern motion (LPM) that is severe enough to interfere with the reliability, usability, and/or tracking performance of magnetic tape 116

As described in further detail below, tape-verification system 102 may generate a simulated current 106 from the PES represented by position signal 104 as the amount of current that would be required of a current amplifier to drive the head position actuator in a tape drive for magnetic tape 116 to correct for a deviation in the servo pattern. Simulated current 106 may then be compared with a number of saturation limits 110 representing the minimum and maximum current that can be generated by the current amplifier. Continued comparison of simulated current 106 with saturation limits 110 may be performed to produce a verification result 108 that indicates whether the servo pattern on magnetic tape 116 is usable or not.

In one or more embodiments, the system may include more or fewer components than the components illustrated in FIG. 1. For example, tape-verification system 102 may include, execute with, or exclude tape head 114 and/or other components for generating position signal 104 from magnetic tape 116. Such components may be local to or remote from each other, implemented in software and/or hardware, and/or distributed over multiple applications and/or machines. Multiple components may also be combined into one application and/or machine. Operations described with respect to one component may instead be performed by another component.

Additional embodiments and/or examples relating to computer networks are described below in Section 6, titled "Computer Networks and Cloud Networks."

In one or more embodiments, a data repository is any type of physical or virtual storage unit and/or device (e.g., a filesystem, database, collection of tables, or any other storage mechanism) for storing data. Further, the data repository may include multiple different storage units and/or devices. The multiple different storage units and/or devices may or may not be of the same type or located at the same physical site. The data repository may be implemented or may execute on the same computing system as tape-verification system 102 or on a computing system that is separate from tape-verification system 102. For example, the data repository may store measurements and/or calculated values associated with position signal 104, simulated current 106, saturation limits 110, and/or verification result 108. The data repository may be communicatively coupled to tape-verification system 102 via a direct connection or via a network.

In one or more embodiments, tape-verification system 102 refers to hardware and/or software configured to perform saturation-based verification of magnetic tape storage. Examples of such operations are described below.

In an embodiment, tape-verification system 102 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Saturation-Based Verification of Magnetic Tape Storage

Figure 3A:
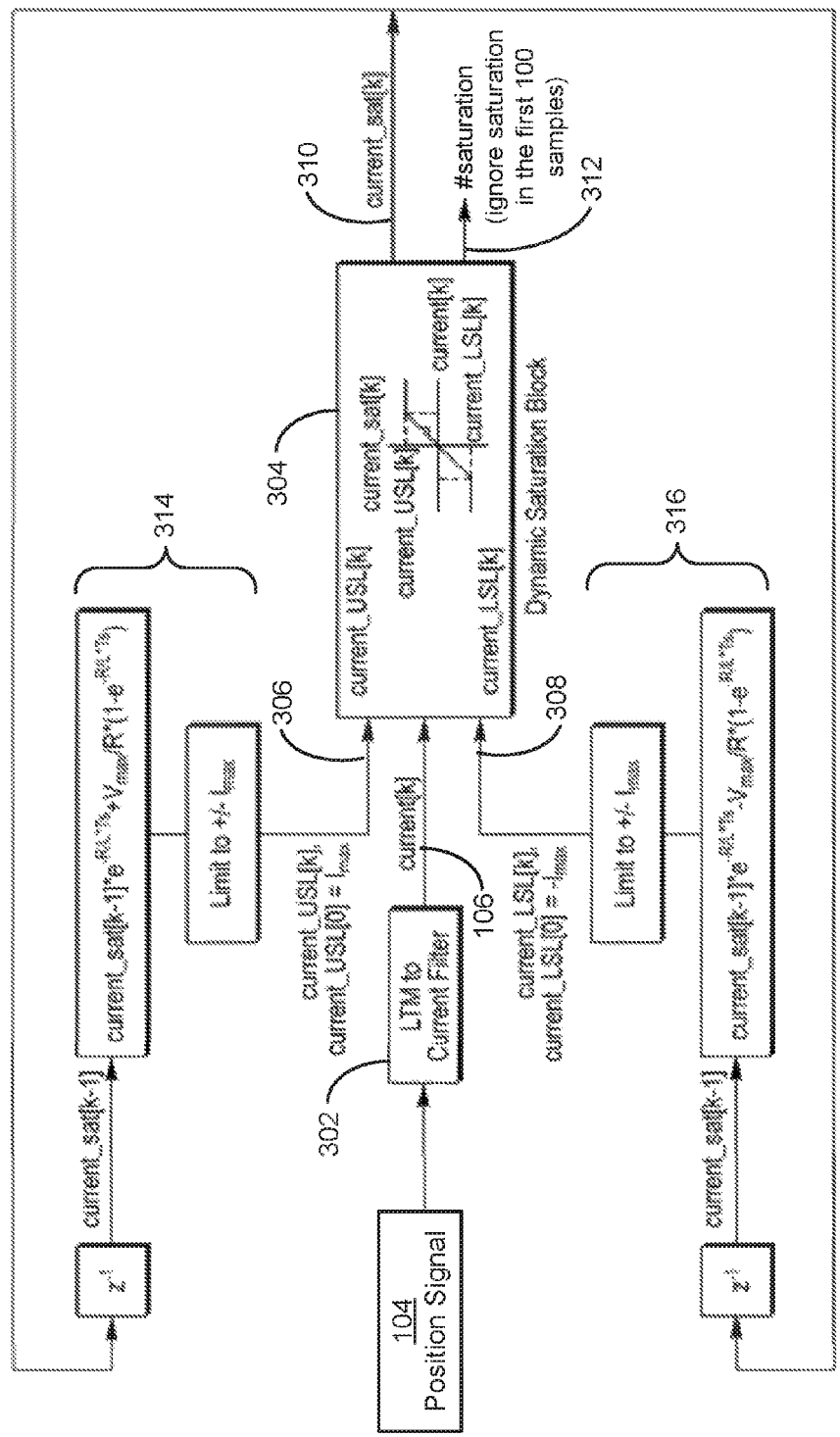
FIG. 3A illustrates the exemplary operation of a tape-verification system in accordance with one or more embodiments.

FIG. 3A illustrates the exemplary operation of a tape-verification system, such as tape-verification system 102 of FIG. 1, in accordance with one or more embodiments. As mentioned above, the tape-verification system may receive a PES represented by position signal 104 that is generated by a stationary tape head while a magnetic tape (e.g., magnetic tape 116 of FIG. 1) is moved longitudinally beneath the tape head. Because the tape head is stationary, position signal 104 may reflect the magnitude of lateral movement in the servo pattern on the magnetic tape as the servo pattern is read by the tape head.

Position signal 104 may be inputted into an LTM to current filter 302 that calculates a value of simulated current 106 (e.g., "current[k]"). For example, LTM to current filter 302 may be represented using a transfer function that includes a first parameter representing a controller for a movable tape head in a tape drive and a second parameter representing a current amplifier and a head position actuator for the tape head. During normal operation of the tape drive, the transfer function may be used in a closed loop environment, in which the controller compares a PES measured using the movable tape head with a PES target and generates a current command to the current amplifier. The current amplifier may generate a voltage based on the current command, and the head position actuator may reposition the tape head according to the voltage. A new PES is then generated from the tape head's new position and a measurement of LTM in the magnetic tape and fed back into the controller for continual updating of the PES based on the PES target. For example, the PES may be compared with the PES target, and the current command from controller 380, voltage from current amplifier 390, and output of head position actuator 396 may be used to minimize a tracking error representing the difference between the PES and the PES target. Thus, simulated current 106 may represent the current command that would be generated by the controller to move the tape head to a new position in a standard tape drive.

Figure 3B:
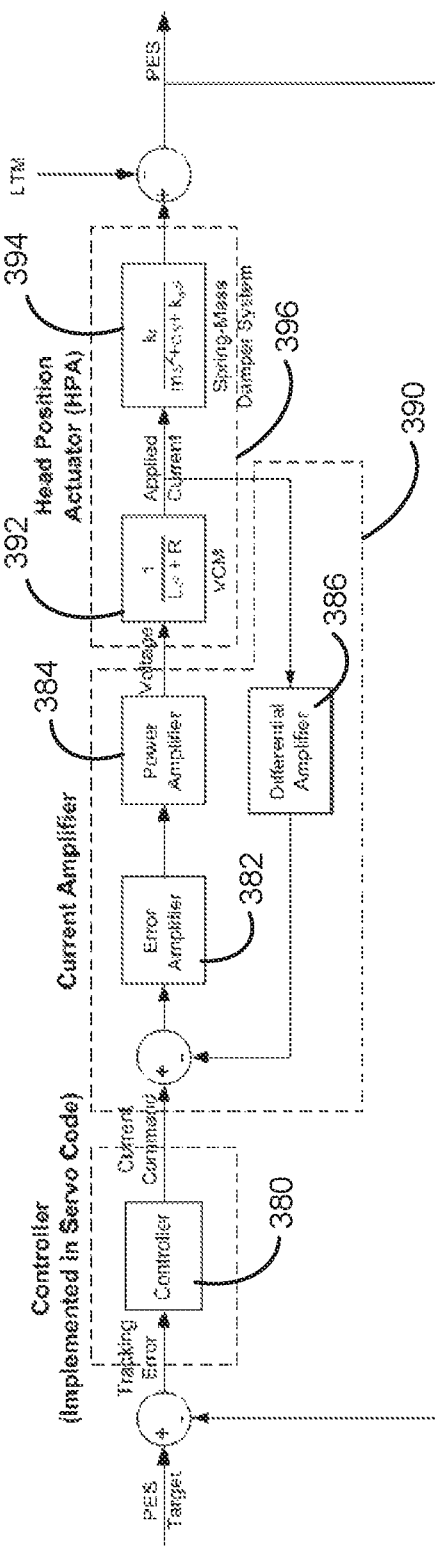
FIG. 3B illustrates the operation of a lateral tape motion (LTM) to current filter in accordance with one or more embodiments.

As shown in FIG. 3B, an exemplary closed-loop representation of LTM to current filter 302 may include a controller 380 that obtains, as input, a tracking error that is calculated as the difference between a PES and a PES target. Controller 380 may output a current command that is fed into a current amplifier 390 that includes an error amplifier 382, a power amplifier 384, and a differential amplifier 386. The output of current amplifier 390 includes a voltage that is fed into a head position actuator 396 that includes a voice coil motor (VCM) 392 and a carriage 394 coupled to a tape head in a tape drive. In FIG. 3B, VCM 392 and carriage 394 are represented as transfer functions with Laplace operators. Thus, the current command outputted by controller 380 may be converted by current amplifier 390 into a voltage that actuates VCM 392. In response to the voltage, VCM 392 may move carriage 394 to reposition the tape head.

After simulated current 106 is generated by LTM to current filter 302 of FIG. 3A, simulated current 106 may be inputted into a dynamic saturation block 304 that compares the most recent value of simulated current 106 to an upper saturation limit 306 (e.g., "current_USL[k]") and a lower saturation limit 308 (e.g., "current_LSL[k]") representing the respective upper and lower bounds of the current command that can be generated by the controller. In turn, dynamic saturation block 304 may output an updated simulated current 310 (e.g., "current_sat[k]") that is bounded by upper saturation limit 306 and lower saturation limit 308. In other words, updated simulated current 310 may reflect a cap on simulated current 106 that can actually be produced by current amplifier in a tape drive instead of a theoretical value of simulated current 106 from LTM to current filter 302 that does not account for limited current-producing capability in the current amplifier.

Updated simulated current 310 may then be inputted into an upper saturation limit mechanism 314 that updates upper saturation limit 306 for a subsequent sample based on the most recent value of updated simulated current 310 and a set of additional parameters associated with controlling the tape head. Updated simulated current 310 may similarly be inputted into a lower saturation limit mechanism 316 that updates lower saturation limit 308 for the subsequent sample based on the most recent value of updated simulated current 310 and the same set of additional parameters. The process may be repeated by using LTM to current filter 302 to calculate a new simulated current 302 from position signal 104, comparing the new simulated current 302 to the new upper saturation limit 306 and lower saturation limit 308, and using dynamic saturation block 304 to output a new updated simulated current 310 based on the comparison.

Dynamic saturation block 304 may additionally output a saturation count 312 (e.g., "#saturation") that tracks the number of times that simulated current 106 from LTM to current filter 302 exceeds upper saturation limit 306 or lower saturation limit 308. Saturation count 312 may be divided by the length of magnetic tape scanned by the tape head to obtain a saturation density for the magnetic tape. If the saturation density exceeds a threshold, the magnetic tape may be deemed unusable. If the saturation density is within the threshold, the magnetic tape may be deemed usable.

The usability or lack of usability of the magnetic tape may then be outputted in a verification result (e.g., verification result 108 of FIG. 1), and subsequent use of the magnetic tape may be managed according to the verification result. For example, a magnetic tape that is deemed usable in a verification result may be released to a customer and/or deployed in a data center. Conversely, a magnetic tape that is deemed unusable in a verification result may be excluded from subsequent sale and/or use in a tape drive.

4. Example Embodiment

A detailed example is described below for purposes of clarity. Components and/or operations described below should be understood as one specific example, which may not be applicable to certain embodiments. Accordingly, components and/or operations described below should not be construed as limiting the scope of any of the claims.

In the exemplary operations of FIGS. 3A-3B, LTM to current filter 302 may include a transfer function in the form of $C/(1+CP)$, where C represents controller 380 and P represents a combination of current amplifier 390 and head position actuator 396. Both C and P may also be transfer functions in the form of $b/a$, as expressed in the following representation:

$$Y(z) = \frac{b_0 + b_1 z^{-1} + b_2 z^{-2} + \ldots + b_{nb} z^{-nb}}{a_0 + a_1 z^{-1} + a_2 z^{-2} + \ldots + a_{na} z^{-na}} U(z)$$

The following difference equation may be obtained from the transfer function representation above:

$$a_0 y[k] = b_0 u[k] + b_1 u[k-1] + b_2 u[k-1] + \ldots + b_{nb} u[k-nb] - a_1 y[k-1] - a_2 y[k-2] - \ldots - a_{na} y[k-na]$$

Where:
  $b_i$: $i^{th}$ coefficient of numerator
  $a_i$: $i^{th}$ coefficient of denominator
  nb: order of the numerator
  na: order of the denominator Like C and P, the expanded transfer function may be represented as b/a, with coefficients for both b and a specified in array vectors. Y(z) may represent a z-transform of simulated current 106, and U(z) may represent a z-transform of position signal 104. As shown above, the transfer function may also be expressed as a $na^{th}$-order difference equation that is solved to calculate the most recent value of simulated current 106 at time step "k" by utilizing the most recent and previous values of position signal 104 and previous values of simulated current 106.

After simulated current 106 is calculated using the transfer function and/or difference equation described above, dynamic saturation block 304 may compare simulated current 106 against upper saturation limit 306 and lower saturation limit 308 using the following:

current[k]>current_USL[k]→current_sat[k]=current_USL[k]

increment #saturation when k>=100 current[k]<current_LSL[k]→current_sat[k]=current_LSL[k]

increment #saturation when k>=100 else→current_sat[k]=current[k]

In the above comparison, updated simulated current 310, as represented by "current_sat[k]" at time step "k," may be capped at upper saturation limit 306, as represented by "current_USL[k]," when simulated current 106 as represented by "current[k]" is higher than upper saturation limit 306. Conversely, updated simulated current 310 may be capped at lower saturation limit 308, as represented by "current_LSL[k]," when simulated current 106 is below lower saturation limit 308. If simulated current 106 is within the bounds represented by upper saturation limit 306 and lower saturation limit 308, updated simulated current 310 may be set to the same value as simulated current 106.

Dynamic saturation block 304 may also update saturation count 312 based on the above comparison. More specifically, dynamic saturation block 304 may increment saturation count 312 whenever simulated current 106 exceeds the bounds represented by the upper and lower saturation limits after the first 100 time steps. After a certain amount of the magnetic tape has been used to determine saturation count 312 (e.g., a pre-specified length of magnetic tape and/or the entire length of magnetic tape), saturation count 312 may be used to calculate the saturation density of the magnetic tape. For example, saturation count 312 may be divided by the length of the magnetic tape to determine an average number of times in which a saturation limit is exceeded, per meter of magnetic tape. If the saturation density exceeds a threshold representing a certain number of saturation events per meter of magnetic tape, the magnetic tape may be identified as unusable. If the saturation density does not exceed the threshold, the magnetic tape may be identified as unusable.

Upper saturation limit 306 and lower saturation limit 308 may also be updated for a given time step "k" using the following equations:

If k=current_USL[0]=$I_{max}$
current_LSL[0]=−$I_{max}$

If $k > 0 \rightarrow$ current_USL$[k]$ = curren_sat$[k-1]e^{-\frac{R}{L}\cdot Ts} + \frac{V_{max}}{R}\left(1 - e^{-\frac{R}{L}\cdot Ts}\right)$ constraints: $-I_{max} \le$ current_USL$[k] \le I_{max}$ current_LSL$[k]$ = curren_sat$[k-1]e^{-\frac{R}{L}\cdot Ts} - \frac{V_{max}}{R}\left(1 - e^{-\frac{R}{L}\cdot Ts}\right)$ -continued constraints: $-I_{max} \le$ current_LSL$[k] \le I_{max}$ In the equations, R may represent VCM resistance, L may represent VCM inductance, $V_{max}$ may represent the maximum voltage that current amplifier 390 can supply, $I_{max}$ may represent the maximum current allowed to VCM 392, and Ts may represent the sampling time. At time step 0, upper saturation limit 306 may be set to the positive value of the maximum current, and lower saturation limit 308 may be set to the negative value of the maximum current. After time step 0, upper saturation limit 306 and lower saturation limit 308 may be updated according to equations that discretize a continuous-time RL circuit with zero-order hold while maintaining constraints on their values based on $I_{max}$.

Figure 4A:
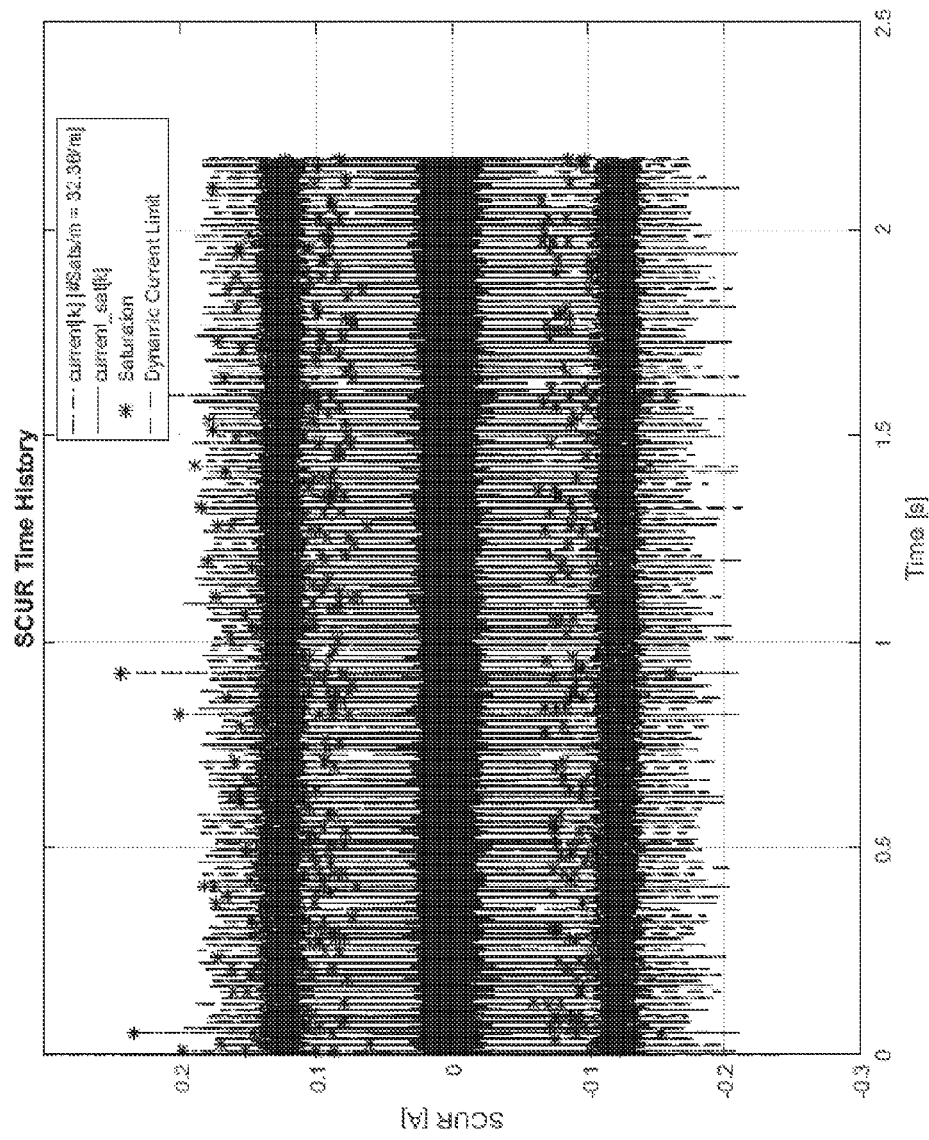
FIG. 4A illustrates an exemplary plot in accordance with one or more embodiments.
Figure 4B:
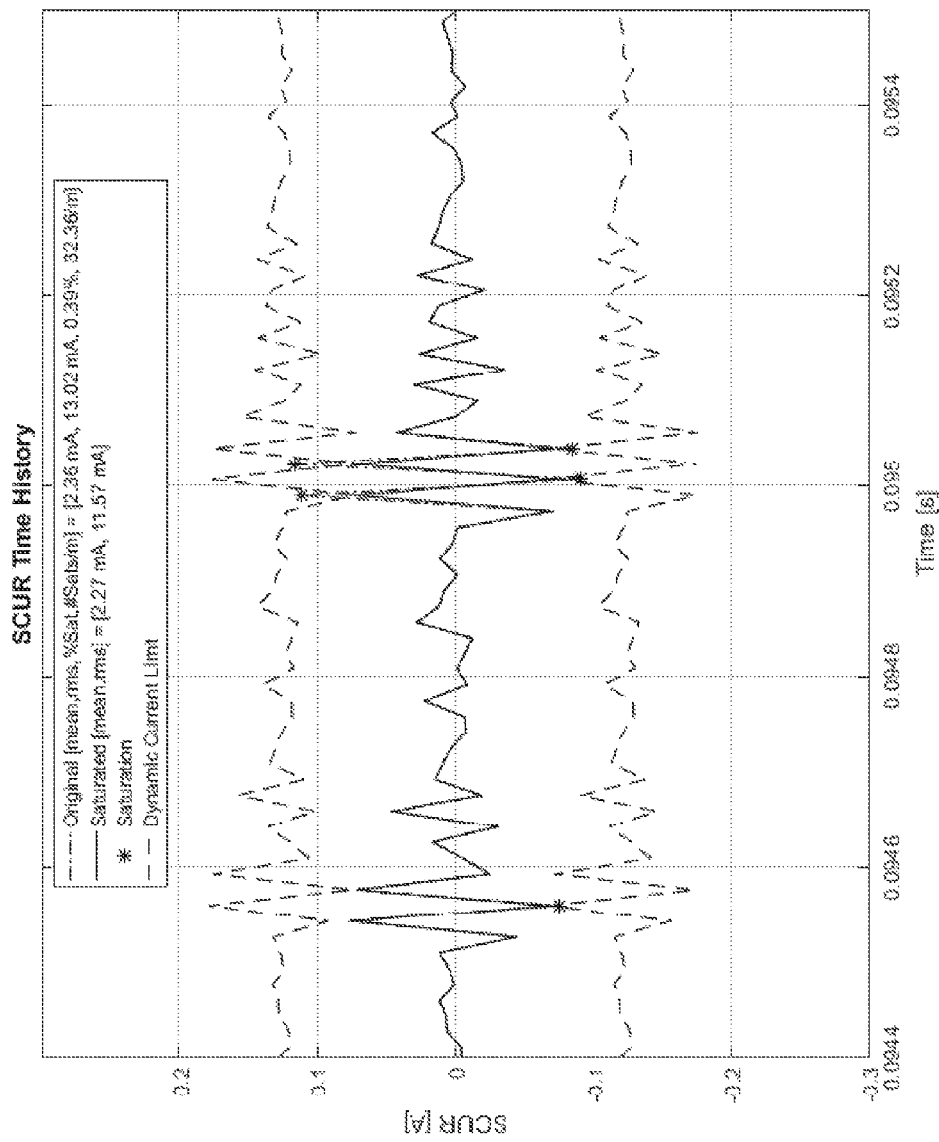
FIG. 4B illustrates an exemplary plot in accordance with one or more embodiments.

Exemplary plots of simulated current 106 generated using the process described above are shown in FIGS. 4A-4B. More specifically, FIG. 4A shows a plot of simulated current (e.g., "SCUR[A]") over 2.5 seconds of time, and FIG. 4B shows a plot of the same simulated current over a subset of time (e.g., from 0.0944 seconds to 0.0955 seconds) spanned by the plot of FIG. 4A. In both plots, a saturation event representing a simulated current that is higher than an upper saturation limit or lower than a lower saturation limit is represented by an asterisk. A legend in the plot of FIG. 4A may indicate that an average of 32.36 saturation events are found per meter of magnetic tape, and dashed lines in the plot of FIG. 4B may represent the upper and saturation limits of a simulated current that is shown as a solid line.

5. Verifying a Servo Pattern on a Magnetic Tape

Figure 5:
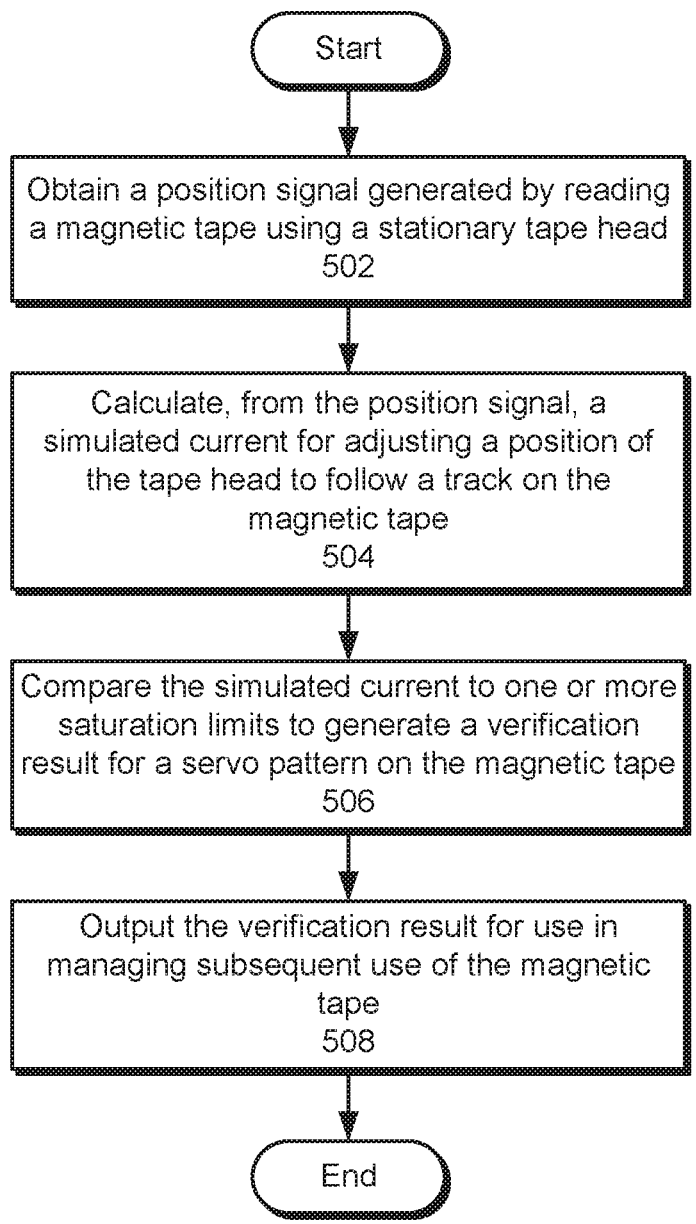
FIG. 5 illustrates a flowchart of verifying a servo pattern on a magnetic tape in accordance with one or more embodiments.

FIG. 5 illustrates a flowchart of verifying a servo pattern on a magnetic tape in accordance with one or more embodiments. In one or more embodiments, one or more of the steps may be omitted, repeated, and/or performed in a different order. Accordingly, the specific arrangement of steps shown in FIG. 5 should not be construed as limiting the scope of the embodiments.

First, a position signal generated by reading a magnetic tape using a stationary tape head is obtained (operation 502). For example, the position signal may be a PES from the stationary tape head that fluctuates in response to lateral motion in a servo pattern on the magnetic tape.

Next, a simulated current for adjusting a position of the tape head to follow a track on the magnetic tape is calculated from the position signal (operation 504). For example, the simulated current may be calculated by applying a filter to the position signal. The filter may include a first parameter representing a controller for the tape head and a second parameter representing a current amplifier and head position actuator for the tape head. The filter may also, or instead, include a difference equation that applies a set of coefficients to a series of position signal values and a series of simulated current values to obtain a latest value of the simulated current.

The simulated current is then compared to one or more saturation limits to generate a verification result for a servo pattern on the magnetic tape (operation 506), as described in further detail below with respect to FIG. 6. Finally, the verification result is outputted for use in managing subsequent use of the magnetic tape (operation 508). For example, the verification result may be outputted in a user interface, notification, file, database, sound, and/or other representation. The verification result may specify if the magnetic tape is usable or unusable, based on the magnitude and/or frequency of LPM in the servo pattern. In turn, the verification result may be used to accept and/or reject magnetic tapes before the magnetic tapes are sold, deployed, and/or otherwise used.

6. Generating a Verification Result for a Servo Pattern on A Magnetic Tape

Figure 6:
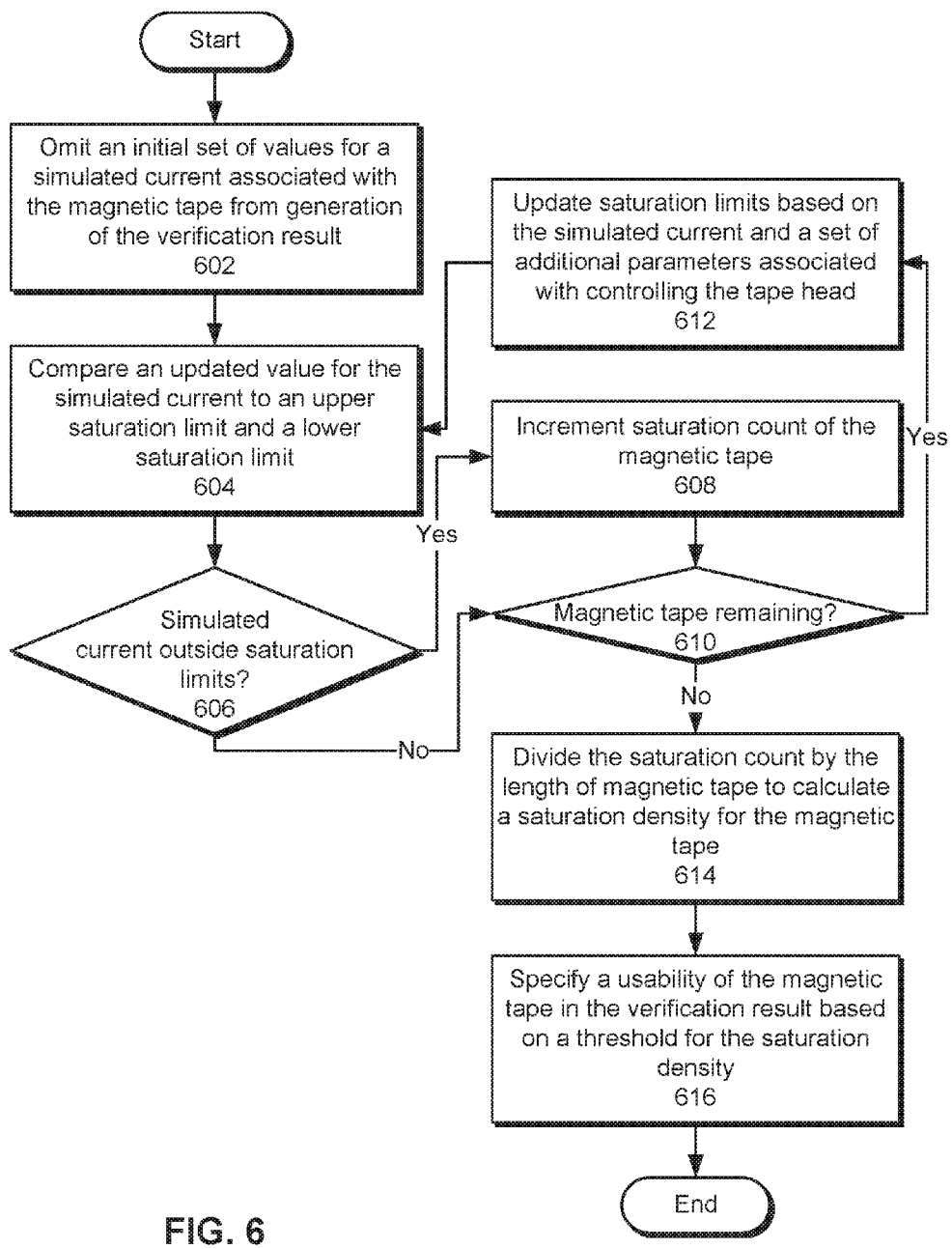
FIG. 6 illustrates a flowchart of generating a verification result for a servo pattern on a magnetic tape in accordance with one or more embodiments.

FIG. 6 illustrates a flowchart of generating a verification result for a servo pattern on a magnetic tape in accordance with one or more embodiments. In one or more embodiments, one or more of the steps may be omitted, repeated, and/or performed in a different order. Accordingly, the specific arrangement of steps shown in FIG. 6 should not be construed as limiting the scope of the embodiments.

First, an initial set of values for a simulated current associated with the magnetic tape is omitted from generation of the verification result (operation 602). As described above, the simulated current may be calculated in a series of time steps from a position signal generated by a stationary tape head. As a result, a pre-specified initial number (e.g., 100) of simulated current values may be excluded from affecting the verification result to initialize other values that are subsequently used to determine the verification result, such as saturation limits to which the simulated current values are compared.

After the initial set of values has passed, an updated value for the simulated current is compared to an upper saturation limit and a lower saturation limit (operation 604) to determine if the simulated current is outside the boundaries represented by the saturation limits (operation 606). For example, the simulated current may be obtained from an LTM to current filter that models the closed-loop behavior of a controller, current amplifier and actuator for a tape head positioned over the magnetic tape, the upper saturation limit may represent an upper bound for the simulated current, and the lower saturation limit may represent a lower bound for the simulated current. As a result, the simulated current may fall outside the bounds of the saturation limits if the simulated current exceeds the upper saturation limit or falls below the lower saturation limit.

If the simulated current falls outside the saturation limits, a saturation count of the magnetic tape is incremented (operation 608). The saturation count may track the number of times the simulated current falls outside the saturation limits after the initial set of values omitted in operation 602. If the simulated current stays within the saturation limits, the saturation count is not incremented.

Such comparisons may be repeated for a remainder of the magnetic tape (operation 610). Prior to obtaining new updated simulated current value in a subsequent time step associated with verifying the servo pattern on the magnetic tape, the saturation limits are updated based on the current value of the updated simulated current calculated from the previous time step and a set of additional parameters associated with controlling the tape head (operation 612). For example, the saturation limits for the subsequent time step may be updated using equations that discretize a continuous-time RL circuit with zero-order hold. The equations may include parameters for the updated simulated current from the previous time step, a VCM resistance, a VCM inductance, a maximum current, a maximum voltage, and/or a sampling time (e.g., sampling interval) the time steps.

After the saturation limits are updated, a new updated simulated current value may be obtained (operation 604), and the saturation count for the magnetic tape is updated based on a comparison of the simulated current with the saturation limits (operations 606-608). While magnetic tape remains to be verified (operation 610), the saturation limits are updated (operation 612) before the next comparison of simulated current with the saturation limits is performed.

After a predetermined portion and/or the entirety of the magnetic tape has been analyzed using operations 604-612, the saturation count is divided by the length of the analyzed portion of the magnetic tape to calculate a saturation density for the magnetic tape (operation 614). For example, the saturation count may be divided by the length, in meters, of the portion analyzed in operations 604-612 to determine the saturation density as an average number of current saturations (e.g., times in which the simulated current falls outside the bounds represented by the saturation limits) per meter of the magnetic tape.

Finally, a usability of the magnetic tape is specified in the verification result based on a threshold for the saturation density (operation 616). For example, the threshold may represent a certain level of error in the servo pattern. As a result, the verification result may identify the magnetic tape as usable when the saturation density does not exceed the threshold and as unusable when the saturation density exceeds the threshold.

7. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread). A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application-programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
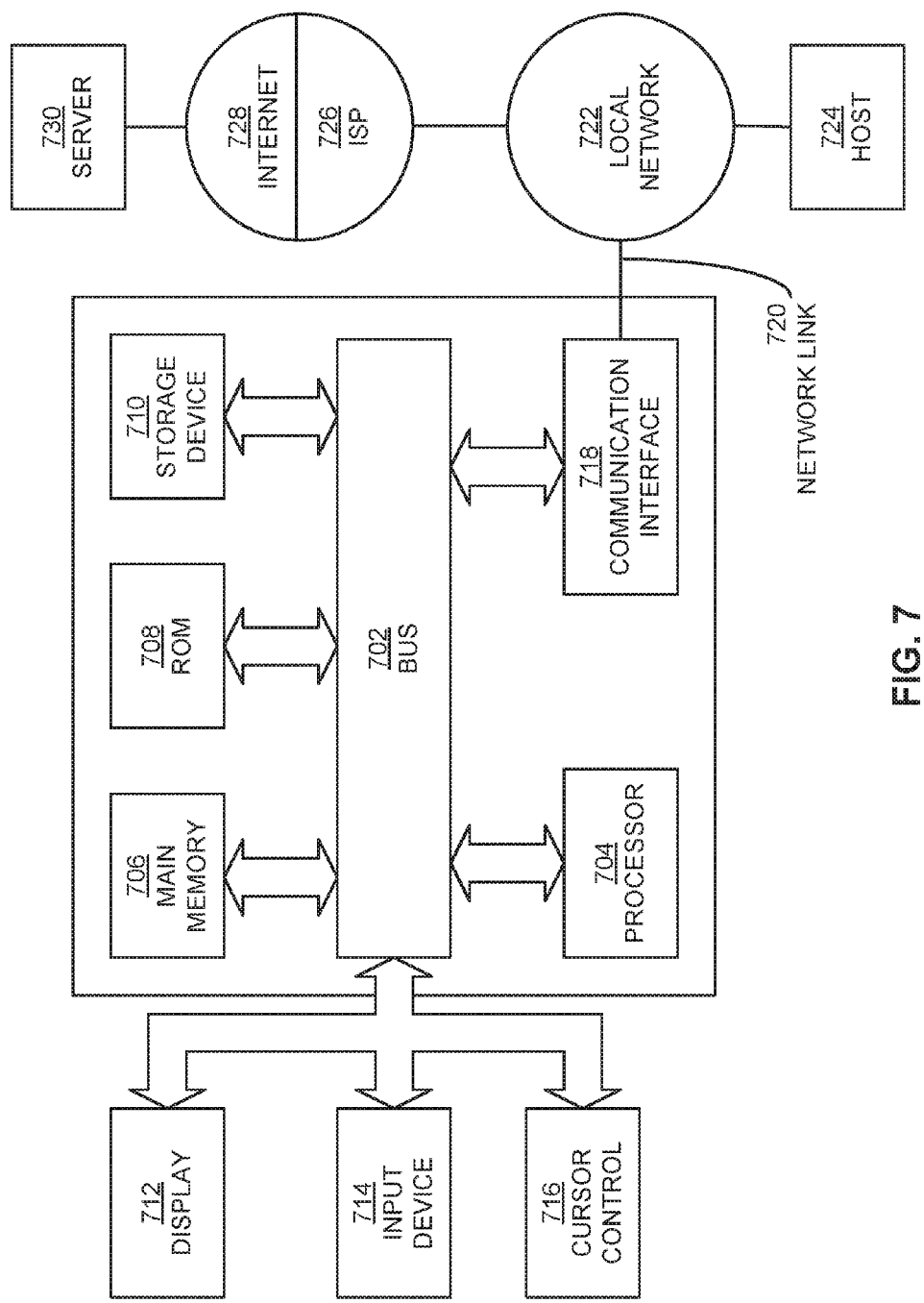
FIG. 7 shows a block diagram that illustrates a computer system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
    obtaining a position signal generated by reading a magnetic tape using a stationary tape head;
    updating, from the position signal, a simulated current for adjusting a position of the tape head to follow a track on the magnetic tape;
    comparing the simulated current to one or more saturation limits to generate a verification result for a servo pattern on the magnetic tape, wherein the verification result classifies the magnetic tape as usable or unusable; and
    outputting the verification result for use in managing subsequent use of the magnetic tape.

2. The medium of claim 1, wherein comparing the simulated current to one or more saturation limits comprises:
    updating the one or more saturation limits based on the updated simulated current from a previous time step.

3. The medium of claim 2, wherein updating the one or more saturation limits based on the updated simulated current comprises:
    calculating a new saturation limit for a subsequent value of the simulated current from a current value of the updated simulated current and a set of additional parameters associated with controlling the tape head.

4. The medium of claim 3, wherein the set of additional parameters comprises:
    a voice coil motor (VCM) resistance;
    a VCM inductance;
    a maximum voltage;
    a maximum current; and
    a sampling time.

5. The medium of claim 1, wherein calculating the simulated current for adjusting the position of the tape head to follow the track on the magnetic tape comprises:
    applying a filter to the position signal to obtain the simulated current.

6. The medium of claim 5, wherein the filter comprises a transfer function that includes:
    a first parameter representing a controller for the tape head; and
    a second parameter representing a current amplifier and a head position actuator for the tape head.

7. The medium of claim 5, wherein the filter comprises a difference equation that applies a set of coefficients to a series of position signal values and a series of simulated current values to obtain a latest value of the simulated current.

8. The medium of claim 1, wherein comparing the simulated current to the one or more saturation limits to generate the verification result for the servo pattern on the magnetic tape comprises:
    determining a saturation density representing a frequency with which the simulated current exceeds the one or more saturation limits; and
    specifying, in the verification result, a usability of the magnetic tape based on a threshold for the saturation density.

9. The medium of claim 8, wherein comparing the simulated current to the one or more saturation limits to generate the verification result for the servo pattern on the magnetic tape further comprises:
   omitting an initial set of values for the simulated current from calculation of the saturation density.

10. The medium of claim 8, wherein determining the saturation density comprises:
   dividing a saturation count representing a number of times the simulated current falls outside the one or more saturation limits by a length of the magnetic tape.

11. The medium of claim 8, wherein specifying the usability of the magnetic tape based on the saturation density comprises:
   identifying the magnetic tape as usable when the saturation density falls below the threshold.

12. The medium of claim 8, wherein specifying the usability of the magnetic tape based on the saturation density comprises:
   identifying the magnetic tape as unusable when the saturation density exceeds the threshold.

13. The medium of claim 8, wherein the threshold represents a level of error in the servo pattern.

14. The medium of claim 1, wherein the one or more saturation limits comprise:
   an upper saturation limit; and
   a lower saturation limit.

15. A method, comprising:
   obtaining a position signal generated by reading a magnetic tape using a stationary tape head;
   updating, from the position signal, a simulated current for adjusting a position of the tape head to follow a track on the magnetic tape;
   comparing the simulated current to one or more saturation limits to generate, by a computer system, a verification result for a servo pattern on the magnetic tape, wherein the verification result classifies the magnetic tape as usable or unusable; and
   outputting the verification result for use in managing subsequent use of the magnetic tape.

16. The method of claim 15, further comprising:
   updating the one or more saturation limits based on the updated simulated current from a previous time step.

17. The method of claim 15, wherein calculating the simulated current for adjusting the position of the tape head to follow the track on the magnetic tape comprises:
   applying a filter to the position signal to obtain the simulated current, wherein the filter comprises a transfer function that includes:
   a first parameter representing a controller for the tape head; and
   a second parameter representing a current amplifier and a head position actuator for the tape head.

18. The method of claim 14, wherein comparing the simulated current to the one or more saturation limits to generate the verification result for the servo pattern on the magnetic tape comprises:
   determining a saturation density representing a frequency with which the simulated current exceeds the one or more saturation limits; and
   specifying, in the verification result, a usability of the magnetic tape based on a threshold for the saturation density.

19. The method of claim 18, wherein determining the saturation density comprises:
   dividing a saturation count representing a number of times the simulated current falls outside the one or more saturation limits by a length of the magnetic tape.

20. An apparatus, comprising:
   one or more processors; and
   memory storing instructions that, when executed by the one or more processors, cause the apparatus to:
   obtain a position signal generated by reading a magnetic tape using a stationary tape head;
   updating, from the position signal, a simulated current for adjusting a position of the tape head to follow a track on the magnetic tape;
   compare the simulated current to one or more saturation limits to generate a verification result for a servo pattern on the magnetic tape, wherein the verification result classifies the magnetic tape as usable or unusable; and
   output the verification result for use in managing subsequent use of the magnetic tape.

* * * * *

UNITED STATES PATENT AND TRADEMARK OFFICE
CERTIFICATE OF CORRECTION

PATENT NO. : 9,953,671 B1
APPLICATION NO. : 15/665340
DATED : April 24, 2018
INVENTOR(S) : Wiputra It is certified that error appears in the above-identified patent and that said Letters Patent is hereby corrected as shown below:

In the Specification

In Column 3, Line 56, after "116" insert -- . --.

In Column 7, Line 58, delete "If k=current_USL[0]=$I_{max}$" and insert -- If $k = 0 \rightarrow current\_USL[0] = I_{max}$ --, therefor.

In Column 7, Line 62, delete "curren_" and insert -- current_ --, therefor.

In Column 7, Line 65, delete "curren_" and insert -- current_ --, therefor.

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*